Patented Oct. 14, 1930

1,778,224

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

PRODUCTION OF CALCIUM-ALUMINATE CEMENTS AND FERTILIZER MATERIALS

No Drawing. Original application filed February 6, 1926, Serial No. 86,661. Divided and this application filed June 18, 1927. Serial No. 199,866.

Rapid-hardening calcium aluminate cements, with lime to alumina ratios ranging from $3CaO:Al_2O_3$ to $3CaO:5Al_2O_3$, have heretofore been produced by fusing aluminiferous materials with limestone in proper proportions, a good cement of this character having a low silica content.

Phosphorus or phosphoric acid has been produced by fusing together, under suitable reducing conditions, calcium phosphate (phosphate rock), silica and carbon in either an electric or fuel-fed furnace, the phosphorus content of the charge being volatilized and recovered in proper type condensers or precipitators, or, if phosphoric acid is desired, the phosphorus is oxidized as produced to phosphoric acid and then condensed.

The present invention relates to the discovery that, if a calcium phosphate containing material, low in silica, is furnaced for a suitable time with aluminiferous material, in proper proportions, under reducing conditions, at an appropriate temperature, which may range from approximately 1200° centigrade to about 1600° centigrade, in an electric or shaft furnace or rotary kiln, the phosphorus is volatilized and may be oxidized and condensed as phosphoric acid, while the slag consists of calcium aluminate, which, when ground, is a high-grade calcium aluminate cement.

The aluminiferous material used may be the mineral alunite, which is a hydrous basic double sulphate of potash and aluminum, the best grades of such alunite having a very low silica content.

When a calcium phosphate containing material, such as phosphate-rock, low in silica, is heated at a proper temperature and for a sufficient time to accomplish the reaction, with alunite in correct proportions to give a good calcium aluminate cement, such as one part by weight of phosphate rock and two parts of alunite, preferably in the presence of carbon, a reaction occurs whereby the alumina of the alunite combines in the form of a sinter or slag with the lime of the phosphate-rock to produce a calcium aluminate cement, and the other constituents of the charge are almost completely volatilized and driven from the furnace, such expelled material consisting essentially of the water and sulphur contents of the alunite, as well as the potash content of the alunite, and the $P_2O_5$ content of the phosphate-rock.

The potash and phosphoric acid may be condensed, in any well-known way, as they come from the furnace, and a potassium phosphate and phosphoric acid may be recovered; or, stated differently, the fumes from the furnace can be converted to a salt containing fertilizer materials of potash and phosphate in a highly concentrated form.

It is to be understood that a sufficient amount of the specified ores would be used to give the indicated percentage of lime to alumina, the range of which is set forth at the beginning of this specification.

One of the main or principal points, or salient novel features of the new method is that the lime required for the preparation of the calcium aluminate cement is furnished by phosphate-rock, or calcium phosphate, instead of calcium carbonate or limestone, with the resulting advantage that phosphoric acid and calcium aluminate cement may be made in one operation, both being desirable, although more or less unrelated, products, and if alunite is employed as the raw material to supply the aluminum, there is the added advantage that potash is recovered in a usable form as a fertilizer, so that three valuable materials are recovered simultaneously by the single process, which have, heretofore, ordinarily required three separate processes.

It will be understood that my invention, as defined by the appended claims, is not limited to the precise and exact details specified and that more or less latitude exists in the manner of performing the process without departure from the heart and essence of the invention and without foregoing any of its substantial attendant advantages.

Although I have referred to the production of phosphoric acid by this process, it is to be understood that, if the phosphorus driven off is not permitted to oxidize, that element by itself may be obtained.

This patent is a division of my earlier pending patent application Serial No. 86,661, filed February 6th, 1926.

I claim:

1. The process of simultaneously producing calcium aluminate cement material and a material containing potash and phosphorus, consisting in heating a mixture of substances containing calcium, potash, phosphorus and aluminum, at a temperature and for a sufficient period of time to volatilize the potash and phosphorus and so low in silica content as to leave a residue which, when ground, constitutes a calcium aluminate cement.

2. The process of simultaneously producing calcium aluminate cement material and a material containing potash and phosphorus, consisting in heating a mixture of substances containing calcium, potash, phosphorus and aluminum, and carbon, under reducing conditions, at a temperature and for a sufficient period of time to volatilize the potash and phosphorus and so low in silica content as to leaves a residue which, when ground, constitutes a calcium aluminate cement.

3. The process of simultaneously producing calcium aluminate cement material and a material containing potash and phosphorus, consisting in heating a mixture of alunite and calcium phosphate, at a temperature and for a sufficient period of time to volatilize the potash and phosphorus and so low in silica content as to leave a residue which, when ground, constitutes a calcium aluminate cement.

4. The process of simultaneously producing calcium aluminate cement material and a material containing potash and phosphorus, consisting in heating a mixture of alunite, calcium phosphate, and carbon, under reducing conditions, at a temperature and for a sufficient period of time to volatilize the potash and phosphorus and so low in silica content as to leave a residue which, when ground, constitutes a calcium aluminate cement.

5. The process of simultaneously producing calcium aluminate cement material and a material containing potash and phosphorus, consisting in heating a mixture of alunite, phosphate-rock, and carbon, under reducing conditions, at a temperature and for a sufficient period of time to volatilize the potash and phosphorus and so low in silica content as to leave a residue which, when ground, constitutes a calcium aluminate cement.

In witness whereof I have hereunto set my hand.

HERBERT H. MEYERS.